US007924309B2

(12) United States Patent
Foster et al.

(10) Patent No.: US 7,924,309 B2
(45) Date of Patent: Apr. 12, 2011

(54) WIRELESS INTEGRATED SECURITY CONTROLLER

(75) Inventors: Sloan B. Foster, San Antonio, TX (US); William Lawrence, San Antonio, TX (US); Matthew C. Reedy, San Antonio, TX (US)

(73) Assignee: Armida Technologies Corporation, San Antonio, TX (US)

( * ) Notice: Subject to any disclaimer, the term of this patent is extended or adjusted under 35 U.S.C. 154(b) by 1424 days.

(21) Appl. No.: 11/368,893

(22) Filed: Mar. 6, 2006

(65) Prior Publication Data

US 2006/0200845 A1    Sep. 7, 2006

Related U.S. Application Data

(60) Provisional application No. 60/658,527, filed on Mar. 4, 2005.

(51) Int. Cl.
*H04N 7/18* (2006.01)
(52) U.S. Cl. ..................................................... 348/143
(58) Field of Classification Search .................... 348/143
See application file for complete search history.

(56) References Cited

U.S. PATENT DOCUMENTS

| 6,859,442 | B1* | 2/2005 | Agarwal et al. | 370/316 |
| 6,996,129 | B2* | 2/2006 | Krause et al. | 370/487 |
| 7,594,002 | B1* | 9/2009 | Thorpe et al. | 709/219 |
| 2002/0019984 | A1 | 2/2002 | Rakib | |
| 2002/0053053 | A1* | 5/2002 | Nagai et al. | 714/712 |
| 2004/0148632 | A1 | 7/2004 | Park et al. | |
| 2005/0275573 | A1* | 12/2005 | Raveendran | 341/120 |
| 2006/0161960 | A1 | 7/2006 | Benoit | |
| 2006/0200845 | A1 | 9/2006 | Foster et al. | |
| 2007/0022449 | A1 | 1/2007 | Boyden et al. | |

* cited by examiner

*Primary Examiner* — James M Hannett
(74) *Attorney, Agent, or Firm* — Hulsey, P.C.; William N. Hulsey, III; Loren T. Smith

(57) ABSTRACT

A system and method are disclosed for improved video transmission, particularly in security settings. An improved security controller combines the interfaces and functionality for high quality video delivery over often less-than-perfect wireless networks, multi-camera analog/digital video controllers and encoders, multi-frequency wireless camera support, connectivity for serial controllers, network switching, and distributed digital video recording with optional object and motion detection. The video transmission in enhanced using wireless adaptive video encoding, mobile viewing optimization, and wireless bandwidth improvement.

11 Claims, 1 Drawing Sheet

WIRELESS INTEGRATED SECURITY CONTROLLER

CROSS REFERENCE TO RELATED APPLICATION

This patent application claims the benefit of priority from U.S. Provisional Patent Application Ser. No. 60/658,527 filed on Mar. 4, 2005. This application incorporates by reference the entire disclosure of U.S. Provisional Patent Application Ser. No. 60/658,527.

FIELD OF THE INVENTION

The present invention relates generally to the field of video transmission, and may have particular application in the field of video security.

BACKGROUND OF THE INVENTION

Historically, the security and surveillance market has been dominated by analog closed-circuit television (CCTV) systems that have operated in a relatively isolated fashion and have been largely overlooked by any remarkable technological advancement. Expensive to install and vexing to maintain, CCTV systems require deployment of a complex network of coaxial cables or fiber cables and connecting to a number of analog cameras, stationary monitors, and videocassette recorders for archiving functions. Once the difficult installation procedure is completed, the buyer must also maintain a storage room to house the archives of videotapes. Reviewing historical video is time-consuming and tedious; as videotapes degrade rapidly, the quality of the archive will be poor. Since CCTV systems are analog-based (not digital), recorded images can only be viewed from videotapes using a video player connected to monitors. Once such a CCTV system is in place, even a minor change can be a major expense, with the hassle of running new cables and determining what hardware will work with the existing system.

The traditional approach to video surveillance and security employs coaxial, fiber-optic, or other types of cabling for connecting the various elements. There are numerous serious problems with this approach: Cables are easily damaged or severed by bad weather, birds, insects, accidents or saboteurs, and thus require nearly constant monitoring, maintenance and repair. If the cameras are somewhat distant from the monitoring station, then expensive trenching may be required to lay the cables. Furthermore, cables cannot be strung over long distances without sacrificing image quality or having to build expensive booster stations along the way. The use of cable thus requires the close physical proximity of the monitoring stations to the areas under video surveillance, or leasing expensive communications facilities from service providers.

The recent trend toward "convergence"—combining traditional CCTV applications with digital data networking technology—has ushered in a welcome change in the CCTV industry. The most widely available digital products are known generically as video servers. These devices can deliver live video automatically or on request, to a web browser or other professional security applications. This device typically connects up to 4 standard analog cameras via coaxial cable. The video server then digitizes, compresses, and distributes the video streams over an Ethernet interface onto a computer network, effectively turning analog cameras into network cameras.

Following on the heels of video servers has been the development of digital (also known as IP or Internet Protocol) cameras. These cameras are more expensive than their analog counterparts, but are able to connect directly to a digital computer network, and their video can be viewed from any workstation that is connected to the same network. The drawback to digital cameras is that they typically send large amounts of data (video streams contain very large amounts of data; on the order of 10 to 100 times more than is usually sent over a normal data network at one time) and can quickly overload a computer network. Even some of the newer cameras that can support video compression still send far more video data across the network than is usually seen in a data only network.

Once the video has been digitized, it can be easily recorded for later review using recently developed digital video recorder (DVR) technology rather than using old style videotapes. DVRs allow the recording of large amounts (thousands of hours) of video on very large computer hard disks, as well as provide fairly easy-to-use rewind, search and play functions on the video from any personal computer or web browser. However, most commercial DVR devices are standalone units and are not integrated with cameras or other network devices.

As security systems transition to digital technologies, there has been a strong desire to move toward wireless video surveillance using a variety of proprietary microwave technologies. Unfortunately, since most of the commercially available wireless products are designed for the computer data networking (as opposed to streaming video surveillance), network configuration is very complicated. Plus, video quality suffers from limited available wireless bandwidth (since video contains so much more data than normal data networks) and unstable wireless connections. Off-the-shelf wireless systems have very limited security capabilities and are subject to relatively easy interception. Expensive, specialized professional services for design, implementation, and ongoing support are also often required.

In addition to video surveillance, physical security also involves the need to monitor and manage a variety of other devices such as fire & burglar alarm control panels, access control mechanisms (swipe card, biometric or keypad entry for doors and gates), and environmental sensors (temperature, liquid, etc.). These devices are usually monitored and programmed using remote computer terminals that are connected to the devices using a serial data connection (known as RS-232, RS-422 or RS485 communications). Thus, long strings of wires must be run from these devices back to a central monitoring station where a terminal is used to monitor the activity at the devices and to program them to perform in the desired fashion.

In summary, the primary challenges facing implementers of security and surveillance systems today are several: 1) while wireless communication is an ideal choice to reduce the amount of cabling that has to be done both for surveillance cameras, the technology has many drawbacks (such as limited bandwidth and signal interference resulting in lost data) that especially disrupt the transmission of video; 2) many current wireless systems use proprietary radios and communication methods that prevent users from integrating them with the existing standards-based networks; 3) integrators wishing to provide remote monitoring and recording of surveillance video must today purchase several products from several vendors and tediously knit them together into an integrated solution using hardwired cables; and 4) security implementers wishing to provide remote monitoring and control of fire and burglar alarm panels, access control devices and environmental sensors along with surveillance video also have to select multiple products from multiple vendors and struggle with identifying the source of problems when the system fails to operate correctly.

Accordingly, what is needed are an integrated security controller and an enhanced video transmission method of the type disclosed herein.

SUMMARY OF THE INVENTION

An improved security controller is disclosed. In a preferred embodiment, the controller is a single hardware and software device that combines the interfaces and functionality of virtually all commonly required security and surveillance tasks: high quality video delivery over often less-than-perfect wireless networks, multi-camera analog/digital video controllers and encoders, multi-frequency wireless camera support, connectivity for RS232/422/485 and other serial controllers, Ethernet switching, and distributed digital video recording with optional object and motion detection.

There are four embodiments disclosed that may also be implemented to enhance the functionality of the security encoder: wireless adaptive video encoding, mobile viewing optimization, wireless bandwidth improvement and security device integration. These are disclosed in further detail below.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
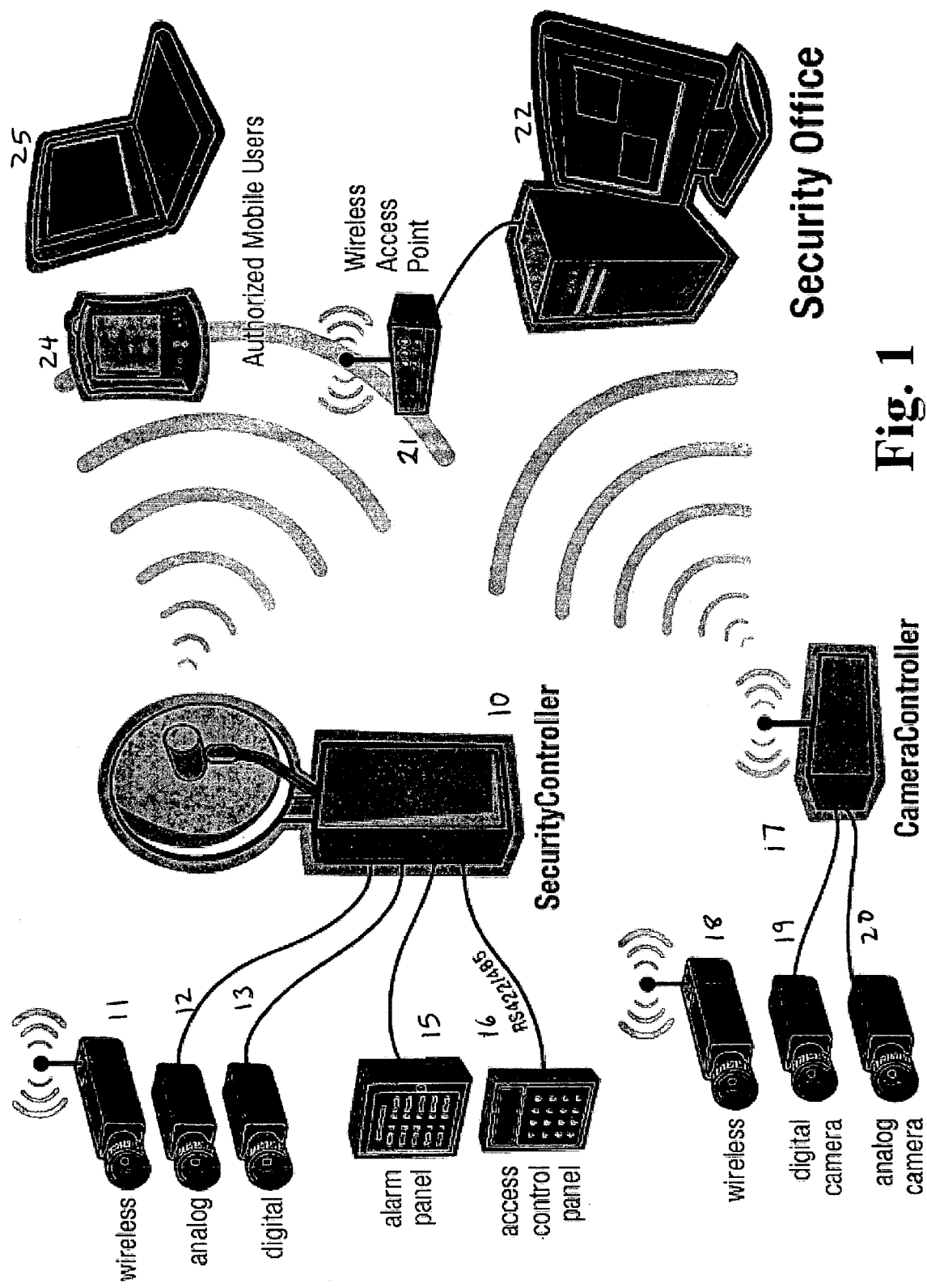
FIG. 1 illustrates a block diagram of an integrated security controller in accordance with the present invention and associated security network devices or nodes.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As referenced above, embodiments of the invention provide an integrated wireless security controller with improved video transmission.

The invention addresses the troublesome limitations of packet loss in traditional wireless communication through two innovative techniques. Using an advanced form of forward error correction ("erasure coding"), packets of video data are augmented with additional packets of error correction information. As all of the packets are transmitted, if and when packet loss occurs, the receiver is able to reassemble the original data packets using the additional information stored in the error correction packets. In one embodiment, the security controller uses a variation of the Reed-Solomon Erasure (RSE) technique to create the error correction information.

Second, the security controller continuously monitors the "health" of the wireless connection between the sender and receiver, by examining the amount of data loss being experienced, the radio signal strength, and number of errors occurring during transmission. More specifically, the controller continuously senses the state of the wireless channel and sends test packets to measure the following parameters: round trip time (RTT), packet loss rate, bit rate, retries and link quality (signal & noise data). These parameters are then used to feed the configurable erasure correction formula so that the optimal amount of redundant data is transmitted with each packet of video. Using this information, the security controller selectively adds or removes additional error correction data to the video data being transmitted. Thus, in especially "noisy" or "lossy" connections, the security controller adds additional error correction data enabling the receiver to reassemble the video even when large amounts of the transmitted data is lost in the connection.

More specifically, WAVE is a combination of several video processing software elements: erasure coding, selective application of erasure coding to specific video frames, data interleaving, block allocation based on actual errors, network health monitoring with adaptive erasure coding, MAC layer protocol enhancement, and selective acknowledgement. All data is transmitted in a secure, encrypted form using the Advanced Encryption Standard (AES). AES is a "serial" encryption technique—meaning that each succeeding packet of data is encrypted using prior packets of data. If one packet is lost during the transmission, then it is impossible to decrypt any packets following that lost packet. Thus our technique implements guaranteed delivery of the important packets of data, so the entire stream can be decrypted.

The erasure coding element is a mathematical formula for creating additional redundant data (known as "Forward Error Correction" or "FEC") packets that are transmitted over the wireless network. As long as some portion of the redundant data is received, the transmitted video can be reassembled. Redundant data may be created using one of the following techniques: parity, LDPC (low density parity check), Reed-Solomon, Hamming codes, or XOR (eXclusive-OR).

The selective application of erasure coding to specific video frames involves adding more redundant data elements to more "important" video frames. Video that is compressed using the MPEG4 technique is divided into 3 different types of frames—I, P and B frames. The receiver can gracefully sustain or conceal the loss of "less important" frames (B and P frames), but if "more important" frames (I frames) are lost, then the video becomes jerky and blocky. Our technique applies additional redundant data to the "more important" frames while applying less redundant data to the "less important" frames.

The data interleaving component is implemented wherein the sender resequences the packets before transmitting them to the receiver, so that originally adjacent packets are separated by a certain distance that may eventually be variable over the time. The transmitted packets are returned to their original order at the receiver. The interleaving disperses the effect of packet loss.

Packet loss in wireless networks can exhibit temporal dependency or burstiness. For instance, if packet n is lost, packet n+1 is also likely to do so. This leads to burstiness in network loss, which may worsen the perceptual quality compared to random loss at the same average loss rate. As a consequence, the performance of FEC is affected, i.e., the percentage of packets that can not be recovered. Moreover, the final loss pattern (FLP) after FEC recovering could be even burstier due to the dependency between loss events.

Combining a loss-run-length model and an inter-loss distance model facilitates accurate capture the channel burstiness, i.e., loss clustering and the distances between those clusters. Using this technique, FEC blocks are allocated to reduce or minimize the transmitted redundancy packets while achieving high robustness against wireless loss. Moreover, the FEC block allocation method can be used to dynamically tune the transmitted redundancy. The FEC allocation scheme takes into account the redundant FEC packets when projecting the future loss pattern segment over the communication link.

The network monitoring component is implemented as the controller continuously senses the state of the wireless channel and sends test packets to measure the following parameters: round trip time (RTT), packet loss rate, bit rate, retries and link quality (signal & noise data). The feedback mechanism uses receivers to periodically send a list of which packets were received and which were lost in the prior window of N packets. Given this information, the loss characteristics (including burst loss) can be captured at the sender. These parameters are then used to feed the configurable erasure correction formula so that the optimal amount of redundant data is transmitted with each packet of video.

The MAC layer protocol enhancement involves using UDP (User Datagram Protocol—one of the core protocols of the Internet protocol suite), multicasting and exploiting a feature of the 802.11 networking standard known as "point coordinated function" (PCF). UDP is a non-acknowledged mechanism for transmitting data between a sender and a receiver. By using this technique, the amount of overhead data transmissions that occur in a typical TCP/IP acknowledged network is reduced. However, even when UDP data is transmitted over an IEEE 802.11 standard network, it is still acknowledged; thus, the multicast form of network transmission. Multicast packets are not acknowledged on 802.11 networks.

The default operating mode of 802.11 network cards is "distributed coordinated function" (DCF) which is a time-sharing (collision avoidance) data transmission technique. A device on the network that wishes to transmit first listens on the channel to see if any other device is transmitting, and if none are, then it transmits. Devices configured this way can easily be jammed, and throughput is limited because of the wait time. In PCF mode, a network device operating as an access point can specifically contact each device one-on-one on the network and ask if there is any data to transmit. If so, then a one-to-one conversation is begun between the access point and that device. There is no wait time. This improves the overall throughput of the network.

Finally, the selective acknowledgement technique ensures that enough of the redundant data is received, even in light of up to 25% packet loss, by specifically requesting retransmission of "more important" packets, including the FEC packets.

In addition to security applications, the foregoing techniques can be applied with equal utility in other multimedia applications, such as wireless delivery in the home or business. In this regard, embodiments of the inventions disclosed herein may be applied for content delivery for personal multimedia products, such as the MP3 players. In addition, aspects of the invention can be utilized to enable multimedia to be streamed wirelessly directly from the residential gateway to these types of wireless-enabled devices:

Set top boxes and other IP multimedia systems. Enables streaming of standard and high definition (HD) television from the residential gateway to wireless set top boxes and other IP enabled systems distributed throughout the home.

Wireless gaming. Reliable wireless interface for massively multiplayer and other video games.

Voice over IP (VOIP). Reliable, wireless voice communications over IP telephone systems in the home.

Other data-intensive multimedia communications.

Mobile Viewing Optimization

With respect to the security application, a significant feature of the security controller is the ability to transmit the surveillance video to handheld or laptop computers used by security personnel. Thus, security guards are not tied to watching the video in a fixed location on TV monitors, but instead can patrol their facilities and continue to monitor the activity being viewed by surveillance cameras. The security controller interrogates the receiving device (handheld or laptop computer) for its display capabilities, and dynamically adjusts the viewing size of the video and the rate of video data being transferred based on what the viewer is capable of processing.

Wireless Bandwidth Improvement

In one embodiment, the security controller exploits a feature of the 802.11 wireless networking standard called PCF (point coordination function). The default operating mode for 802.11 devices is DCF (distributed coordination function). In DCF mode, the wireless transmitter first listens to see if any other device is currently transmitting on the channel. If the channel is clear, then the transmitter sends a packet of information and awaits an acknowledgement that its packet was received. This technique works well in a typical wireless network where there are several "client" computers communicating through an access point to connect to the Internet.

However, the DCF mode is not optimal for the higher bandwidth requirements of continuous video. Using the PCF mode, which is a polling mode of operation, the security controller is specifically requested to send its video data by the receiving unit, and a direct, two-way communication dialog ensues, during which no other devices can transmit. This "clears the airwaves" of potential interference and contention, allowing the security controller full access to virtually the entire bandwidth available on the wireless network. Since video transmission uses much more bandwidth than typical data transmissions, the PCF mode allows higher quality and a higher volume of video data to be transmitted than is available in off-the-shelf network devices.

Security Device Integration

In a preferred embodiment, the security controller of the present invention integrates the functionality of multiple devices in a single, easy-to-install and easy-to-manage package. As shown in FIG. 1, in addition to supporting surveillance video (whether wireless 11, or wired analog 12 or digital 13), the security controller 10 provides connections to fire and burglar alarm panels 15, motion detectors, access control devices 16 (such as controlled access gates and doors) and environmental sensors.

In addition, security controller 10 may communicate with other wireless nodes via a wireless access point 21. Wireless access point 21 may communicate with any number of wireless devices, including a security office workstation 22, authorized mobile users 24, 25 or any number of other devices on the wireless network.

In an alternative embodiment, a camera controller 17 is utilized. A camera controller need not provide access to various security panels such as alarm panel 15 and access panel 16. Camera controller 17 provides other integrated functions, however, such as controlling and receiving data from cameras 18, 19 and 20, and communicating with wireless node 21.

This related security data can be combined with the surveillance video and transmitted wirelessly, freeing the installer from having to run long distances of cables and wires to these devices. The receiver can then monitor and control these additional appliances over the wireless network.

More specific features and functions that in various embodiments may be integrated on the security controller 10 or camera controller 17 are the following:

1. Accepts analog video input from a plurality of analog cameras;
2. Accepts digital video input from a plurality of digital cameras;
3. Digitizes and encodes the analog video streams into a digital format, such as MPEG4;
4. Accepts motion digital images (e.g., JPEG images) and digital video (e.g., MPEG4 video streams) from the digital cameras. Can be adapted to automatically transcodes motion digital images into video streams (e.g., JPEG to MPEG1);
5. Encrypts video streams using, for example, AES (Advanced Encryption Standard—FIPS 197) encryption;
6. Encapsulates the video streams using wireless adaptive video encoding;
7. Transmits a plurality of video streams over a wireless network (e.g., 802.11 a/b/g, 802.16-WiMAX or 900 MHz). The specific wireless radio is readily modifiable. For example, any radio implemented in a standard mini-PCI card can be used;
8. Can simultaneously transmit a plurality of video streams over a wired network (using RJ45 connectors to Cat-5 cabling);
9. Controls up to 32 pan-tilt-zoom camera devices using an RS485 interface;
10. Allows connection of a "panic button," which when pressed, immediately transmits an alarm over the wireless network to the receiving software which alerts the monitoring staff;
11. Automatic failover to alternative communications protocols (e.g., CDMA, GPRS, EDGE or EV-DO). If the primary wireless radio fails or if the system detects that the radio is being externally jammed, the system automatically establishes an alternate connection using cell-phone technology. The specific cell-phone technology is easily changed. The failover capability includes automatic adjustment of the frame rates of the video streams to match the smaller bandwidth that is available over cell-phone technology;
12. Displays a console interface to the embedded software through an interface (e.g., RS-232 interface); and
13. Functions as an independent wireless access point. Authorized nearby Wireless-enabled devices such as laptop computers can connect to the camera controller and access the Internet through it.

While the present invention has been described with reference to one or more particular embodiments, those skilled in the art will recognize that many changes may be made thereto without departing from the spirit and scope of the present invention. In particular, while much of the above-discussion refers to security applications for ease of discussion, it will be readily understood that the inventions disclosed herein will have equal applicability to other forms of video transmission and networking. Each of these embodiments and obvious variations thereof is contemplated as falling within the spirit and scope of the claimed invention, which is set forth in the following claims.

What is claimed is:

1. A method for improving transmission of video information over a wireless network comprising:
    the selective application of erasure coding to a digital video data stream according to the type of video frame, wherein additional erasure coding is applied to I video frames as opposed to B or P video frames;
    interleaving data at the transmitter, wherein said interleaving resequences a set of data packets before transmitting them to a receiver;
    allocating blocks based upon detection of one or more errors;
    monitoring a health of said network;
    applying a MAC layer protocol enhancement; and
    receiving selective acknowledgement from said receiver and retransmitting more important packets as requested by said receiver.

2. The method for improving transmission of video information of claim 1, wherein said video data stream has a plurality of frames, and said applying erasure coding step is performed selectively based upon a determination of which of said plurality of frame are sufficiently important.

3. The method for improving transmission of video information of claim 1, wherein said video data stream has a plurality of frames and is compressed using MPEG4 compression.

4. The method for improving transmission of video information of claim 3, wherein said applying erasure coding step is performed selectively to I frames.

5. The method for improving transmission of video information of claim 1, wherein said monitoring comprises sensing the state of a wireless channel.

6. The method for improving transmission of video information of claim 1, wherein said monitoring comprises measuring one or more of the following parameters: round trip time (RTT), packet loss rate, bit rate, retries and link quality.

7. The method for improving transmission of video information of claim 1, wherein said applying a MAC layer protocol enhancement comprises using User Datagram Protocol.

8. The method for improving transmission of video information of claim 7, wherein said applying a MAC layer protocol enhancement further comprises multicasting.

9. The method for improving transmission of video information of claim 8, wherein said applying a MAC layer protocol enhancement further comprises using point coordinated function.

10. The method for improving transmission of video information of claim 1, wherein said video information comprises security video.

11. The method for improving transmission of video information of claim 1, wherein said wireless network comprises a home media gateway.

* * * * *